US011805188B2

(12) United States Patent
Woodland et al.

(10) Patent No.: US 11,805,188 B2
(45) Date of Patent: Oct. 31, 2023

(54) HUB AND SPOKE PUBLISH-SUBSCRIBE

(71) Applicant: Itron, Inc., Liberty Lake, WA (US)

(72) Inventors: Bernard M. Woodland, Cary, NC (US); Eric Donald White, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 19 days.

(21) Appl. No.: 17/378,526

(22) Filed: Jul. 16, 2021

(65) Prior Publication Data

US 2023/0015893 A1     Jan. 19, 2023

(51) Int. Cl.
*H04L 67/55* (2022.01)
*H04L 67/563* (2022.01)
*H04L 67/562* (2022.01)

(52) U.S. Cl.
CPC ............ *H04L 67/55* (2022.05); *H04L 67/562* (2022.05); *H04L 67/563* (2022.05)

(58) Field of Classification Search
CPC ..... H04L 67/55; H04L 67/562; H04L 67/563; H04L 67/125; G06F 2009/45595; G06F 9/45558
See application file for complete search history.

(56) References Cited

U.S. PATENT DOCUMENTS

| 8,144,714 | B1 * | 3/2012 | Buchko | H04L 51/23 370/392 |
|---|---|---|---|---|
| 10,284,670 | B1 * | 5/2019 | Roche | H04L 67/125 |
| 10,782,990 | B1 * | 9/2020 | Suarez | G06F 11/301 |
| 2010/0082748 | A1 | 4/2010 | Banks | |
| 2015/0286933 | A1 * | 10/2015 | Trivelpiece | H04L 67/55 706/47 |
| 2017/0272270 | A1 * | 9/2017 | Gu | H04B 17/318 |
| 2017/0366492 | A1 * | 12/2017 | Ho | H04L 67/563 |
| 2018/0191813 | A1 | 7/2018 | Harpaz | |
| 2019/0173951 | A1 * | 6/2019 | Sumcad | H04L 67/55 |
| 2020/0099616 | A1 * | 3/2020 | Nguyen | H04L 45/04 |
| 2021/0377109 | A1 * | 12/2021 | Shrivastava | H04L 45/64 |

FOREIGN PATENT DOCUMENTS

| WO | WO-2010108224 A1 * | 9/2010 | ............. G06Q 30/06 |
|---|---|---|---|
| WO | WO-2017083585 A1 * | 5/2017 | ............. A63B 71/06 |

OTHER PUBLICATIONS

Extended European Search Report dated Nov. 29, 2022 for European Patent Application No. 22185337.7, 11 pages.

* cited by examiner

*Primary Examiner* — Kevin T Bates
*Assistant Examiner* — Ranjan Pant
(74) *Attorney, Agent, or Firm* — Lee & Hayes, P.C.

(57) ABSTRACT

Techniques for hub and spoke publish-subscribe are described herein. In some examples, an outgoing-data database comprising addresses of remote device hubs on respective remote devices is maintained. First data is received from a first process operating on the device. The first data is sent to a first remote hub associated with a first remote device and associated with an entry in the outgoing-data database. An incoming-data database is maintained to associate processes operating on the device with data to which the processes subscribe. Second data is received from a second device hub associated with a second device. It is determined—by reference to the incoming-data database—that the second data is data subscribed-to by a second process operating on the device. The second data is sent to the second process.

20 Claims, 10 Drawing Sheets

HUB AND SPOKE PUBLISH-SUBSCRIBE

BACKGROUND

A first networked device may be required to send and/or receive information from other networked device(s). In some networks, such as networks connecting utility meters or other commonly-owned or operated devices, full connectivity (every device having the ability to direct-connect with every other device) is inefficient. Additionally, information management within individual devices is problematic, particularly in battery-powered devices running multiple processes (e.g., multiple applications) and/or "containers" or virtual machines. Accordingly, a problem exists in finding an efficient and effective communication system and method for data management within a mesh network and within individual devices.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 11 is a flowchart showing example techniques by which incoming and outgoing data is efficiently received and sent by a network-connected device, and showing example techniques for managing subscribed-to data and data that was not subscribed-to.

DETAILED DESCRIPTION

Overview

The disclosure describes techniques for providing a fully connective mesh network, including both inter device communication (e.g., between devices in the mesh network) and intra device communication (e.g., between "containers" and/or "virtual machines" within one or more devices). In an example, the necessity of past networks to provide a pathway between each device and/or process (e.g., software running on a device) and all other devices and/or processes is obviated by the use of hubs. Each hub relays data, information, messages, etc., in a two-way manner between processes associated with that hub and with other hubs. The other hubs may be on remote devices or within "containers" or virtual machines on the same device as the hub.

In an example, each device on the network may be a utility meter (e.g., electricity, gas, or water meter), a computer (e.g., at a utility company headend), a smart transformer, an electrical substation, gas valves, water valves, water or gas pumps, electrical switching, gas storage and/or routing devices, or any other network device. Each device may have a hub (e.g., a "device hub"), which could be a software process configured to relay data between other processes (e.g., container hubs) operating on the device and other hubs on other devices. Each of the processes could be a software application, and could be configured to operate metrology devices, sensors, switches, valves, alarms, user interfaces, radios, powerline communications modems, etc. Each device may also include one or more containers or virtual machines. Each container may include a container hub and one or more processes associated with the container hub. In examples, each container may be associated with a customer, a metrology device, a task, etc. By putting such functionality in a container or virtual machine, security is enhanced, the likelihood of software incompatibility errors is reduced, software update functions are simplified, etc.

In example operation, a process in a container may send a message to the container hub. The container hub may relay the message to the device hub, and the device hub may relay the message to either: a process associated with the device hub; or a device hub on a second device. The device hub on the second device may relay the message to either: a process running on the second device; or a container hub of a container on the second device. The second container hub may in turn relay the message to an appropriate container process.

Some processes may generate or consume (or both) data. For example, a process associated with a switch or sensor may receive a command to change or confirm switch state, or report a sensor reading, or change a frequency of sensor readings. A process associated with a metrology device may report data at intervals, and a process associated with a radio may consume data in a transmission mode and generate data in a reception mode. A process associated with a valve may receive a command to open or close the valve (e.g., by operation of a motor) and may then report success or failure of the operation. Accordingly, processes may be associated with devices and may generate and/or consume data.

Such data may be published by one process and subscribed-to by another process. In this document, schemes of two general types are presented for the publication of data. The first scheme reduces overhead caused by subscription management, while the second scheme reduces network bandwidth consumption.

In a first scheme, data is transmitted from a data-generating process to the device hub of that process (either directly, or by way of the container hub of the process), and from that device hub, to all other device hubs. In the first scheme, each data-receiving device hub would determine if any process directly associated with the data-receiving device hub, or any process associated with any container of the device, had subscribed to the received data. If so, the device hub would forward the data to the appropriate hub and/or process. If not, the device hub would delete the data.

In a second scheme, data is transmitted from a data-generating process to the device hub of that process (either directly, or by way of the container hub of the generating process). The receiving device hub sends the data only to hubs (device hubs of other devices and/or container hubs on the device of the device hub) that have subscribed to the data.

Example System and Techniques

Figure 1:
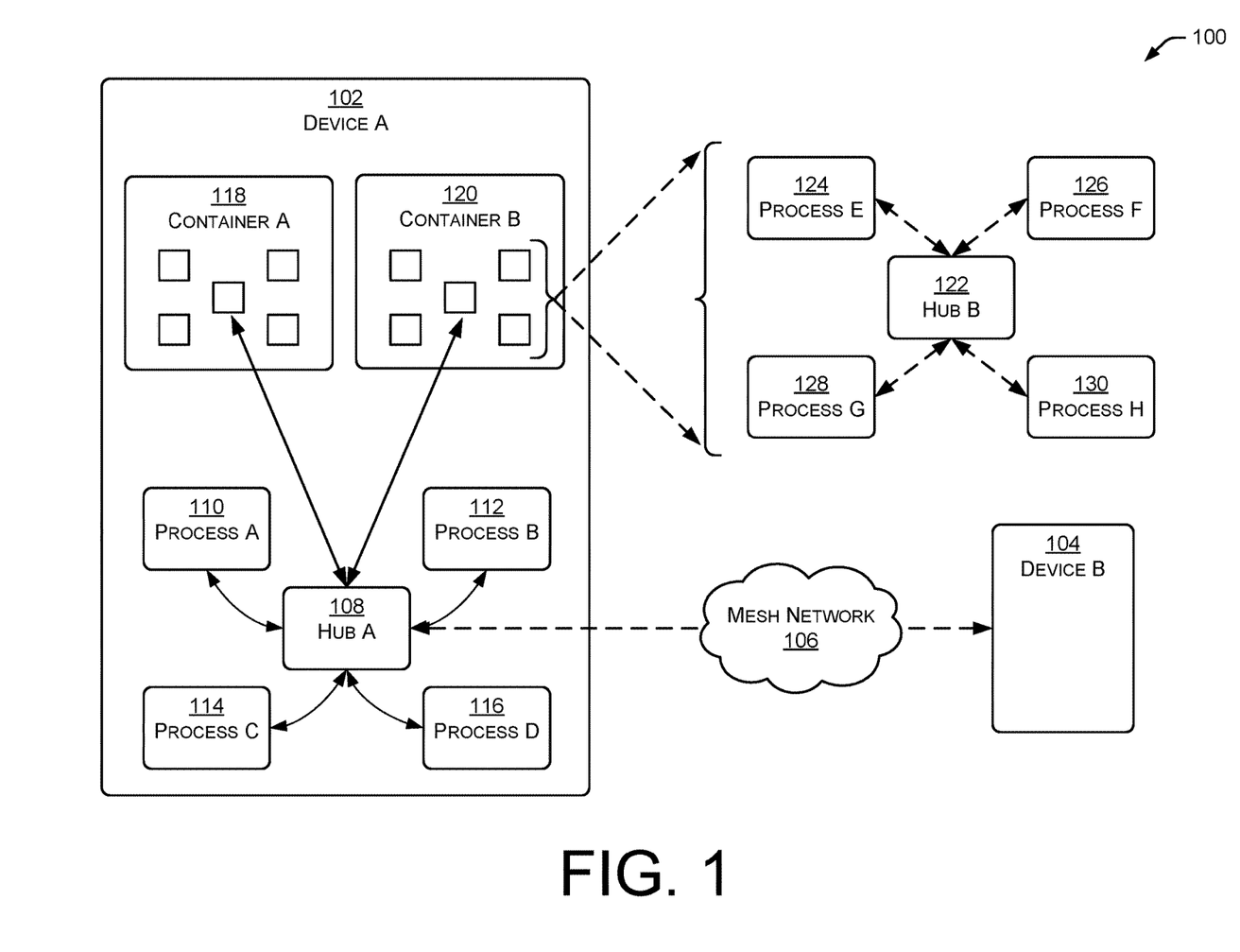
FIG. 1 is a block diagram showing an example network having both intra device and inter device hub and spoke structures to provide publication and subscription data exchange techniques.

FIG. 1 shows an example system or network 100 having both intra device and inter device hub and spoke structures to provide publication and subscription data exchange techniques. Within the system or network 100, two example devices 102, 104 are shown as representatives of a plurality of devices that might be present in networks configured using the techniques discussed herein. The example network may be configured as a mesh network 106, utilizing radio frequency (RF) spectrum, powerline communication techniques, fiber optics, etc.

Device 102 may be a utility meter or other device in a utility or non-utility network of devices. A device hub 108 is in communication with processes A-D shown as 110-116. The device hub 108 and processes 110-116 are typically software-defined processes, but could be fixed in the hardware of an integrated circuit, such as an application specific integrated circuit (ASIC). Each process may be dedicated to a particular task, such as: operating a radio; operating a valve or switch; operating a utility metrology device; operating sensor(s) (earthquake detection, tamper detection, temperature sensing, etc.), etc. The device hub 108 is configured to communicate with each process, and to provide data to which the process subscribes (e.g., a command to close a valve) and to receive data to be published by the process (e.g., metrology consumption data, sensor data, etc.). The device hub 108 may also be configured to communicate with other hubs and to exchange data as needed.

The device 102 includes two containers 118, 120 for purposes of illustration. The use of containers (e.g., virtual machines) may enhance security, reduce software compatibility errors, simplify software update functions, etc. Container 120 is shown in an enlarged view to better illustrate its components. A container hub 122 is configured to communicate with the device hub 108 and with process(es) operating inside the container 120. In the example shown, processes E-H 124-130 are configured to operate within the container 120. Each process may be configured to do a particular job(s), such as the operation of sensors, switches, metrology units, valves, radios, modems, etc.

Within the mesh network 106, each network device (e.g., device 102) may be in direct communication with one or more other network devices (e.g., device 104) using, for example, low power radio frequency (RF) device(s). To send information from the first network device 102 to the second network device 104 (assuming for a moment that they are not in direct communication), information is relayed by one or more other network devices in the mesh network 106. In an example communication, container process 124 may send a message indicating that a valve was successfully closed. The message will be transmitted from the container process 124 to the container hub 122. The container hub 122 will relay the message to the device hub 108. The device hub 108 will relay the message to another device hub of another device within the mesh network 106. In the relay process, one or more device hubs will receive the message and transfer it to an appropriate device hub so that the message reaches its destination (e.g., an upstream server at a utility company that is concerned with the valve closure confirmation of the message).

Figure 2:
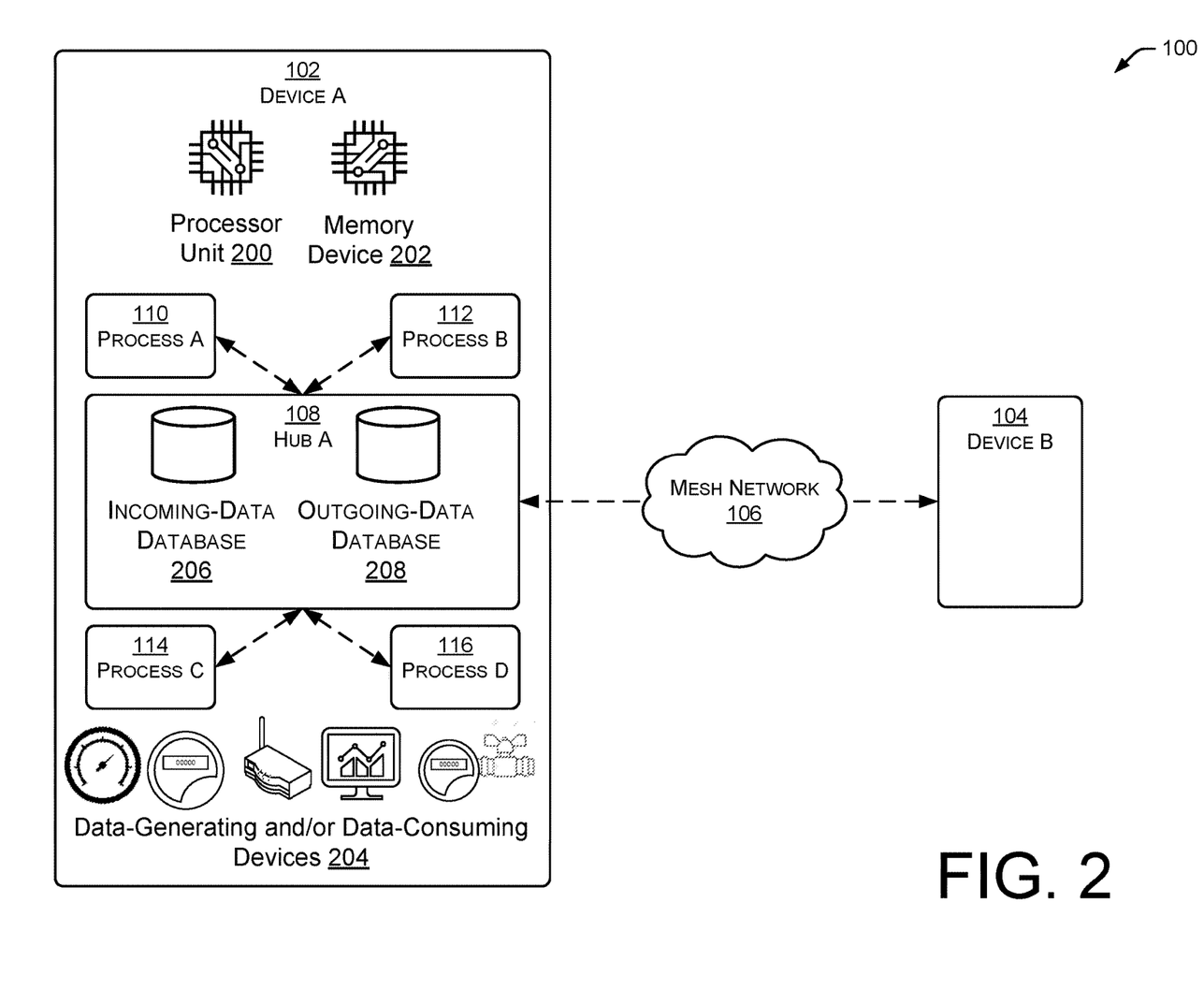
FIG. 2 is a block diagram showing an example network, additionally showing processor(s), memory device(s), and databases within the structure of an example hub.

FIG. 2 shows additional example devices, configurations and techniques of the system or network 100. The containers 118, 120 are not shown for clarity and space. In the example shown, the networked device 102 (e.g., a utility meter or utility system component) includes a processor 200 and a memory device 202. Actions taken by the device hub 108, processes 110-116 and the objects in the containers 118, 120, etc., may be performed by actions taken by the processor in response to execution of statements contained in the memory device 202. In an example, the processor executes a modern real-time multi-tasking operating system (e.g., based on Linux or similar) and the hubs (device hub and container hubs), processes associated with those hubs, and the containers and included processes (seen in FIG. 1) are thereby operational.

The networked device 102 may include a plurality of data-generating and/or data-consuming devices 204. Data-generating and/or data-consuming devices 204 may include valves, valve motors, sensors (temperature, motion, earthquake, pressure, etc.), radios, user interfaces, metrology devices, ultrasonic metrology devices, switches, and others. Each data-generating device and/or data-consuming device 204 may be controlled (fully or in part) by one or more processes 110-116. In examples, each data-generating and/or data-consuming device may send data and/or instructions to one or more processes. This transmission may be performed by dedicated wiring or by connecting the sensors to a bus. Similarly, each process may send data and/or instructions to one or more data-generating and/or data-consuming devices 204. In an example, a motion sensor may send data to a process attempting to detect earthquakes and a process attempting to detect meter tampering. In additional examples, a radio may send and receive data from a plurality of processes. And in a still further example, a process may control a valve, a valve opening/closing motor, and a valve-state sensor.

The example system or network 100 also shows incoming-data database 206 and an outgoing-data database 208, which may be contained in the device hub 108 or may be located elsewhere but are accessible to the hub.

The incoming-data database 206 contains data received by the device hub 108 from (the outgoing-data databases of) remote device hubs. The incoming data may have been sent in case it is needed by process(es) on the device of the device hub 108 or because such processes subscribed to that data.

The outgoing-data database 208 contains outgoing data that is either: sent to all remote device hubs in case a process on that device needs that data; or is sent to select remote device hubs because processes on those devices have subscribed to the data.

The device hub 108 may receive incoming-data from devices that are different from the device of the hub. The incoming-data may be "buffered" in the incoming-data database 206. A determination is made whether the data was subscribed-to by a process operating on the device of the hub. If there is a subscription, the device hub 108 sends the received data to the appropriate process(es). If there is no subscription, the incoming-data is deleted.

The device hub 108 may receive data from local processes on the device of the hub that is "buffered" in the outgoing-data database 208 until the data is sent to other processes, which may be operating on remotely located devices. In an example, a process (e.g., process 110) may be in communication with an ultrasonic metrology unit (UMU) (i.e., a data-generating device 204). The process 110 may send data obtained from the UMU to the device hub 108, which may store the data in the outgoing-data database.

Figure 3A:
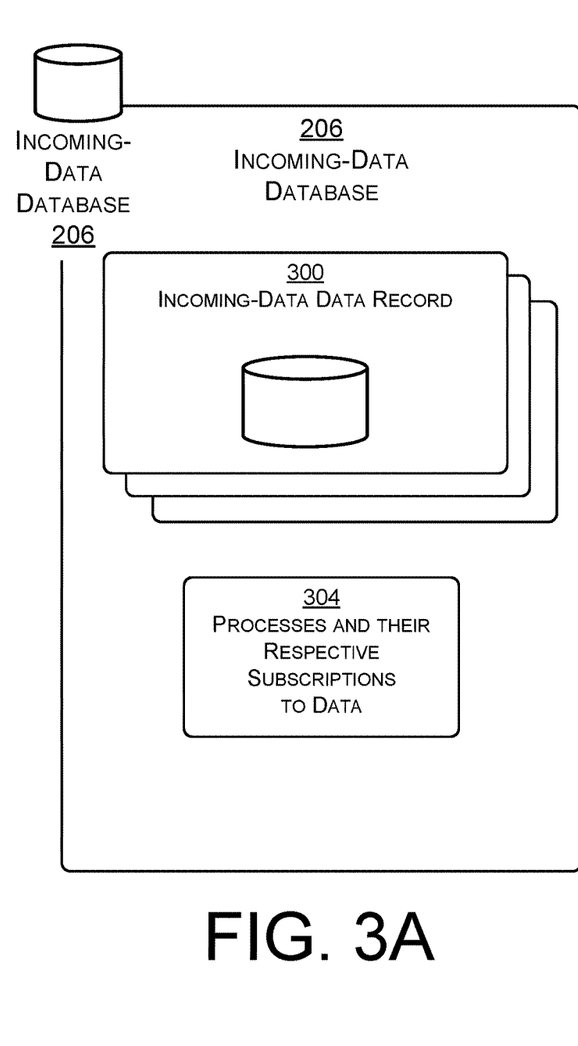
FIGS. 3A and 3B are block diagrams showing additional detail of example databases.

FIG. 3A shows additional detail of an example incoming-data database 206. The incoming-data database 206 stores data—received at a first device from device hubs of other devices—in incoming-data data records 300 until the data can and/or should be sent to processes on the first device. The incoming-data database 206 may also store data (e.g., in records 300) generated by process(es) of the device that is subscribed-to by other process(es) of the device.

The incoming-data data records 300 may include data broadcast from a plurality of devices on a mesh network. The broadcasts may include data that is subscribed-to by process(es) on the first device and may include data that has not been subscribed-to. In operation, the device hub 108 (as seen in FIG. 2) consults a data structure 304 that includes data on processes of the device and their respective subscriptions to data. Using the data structure 304 and the incoming-data data records 300, the device hub 108 determines which processes on the device subscribed to which different parts of the data available in the incoming-data data records 300. The hub then appropriately provides the subscribed-to data (that is available on the incoming-data data records 300) to process(es) on the device. In a first example, copies of the data may be sent to each subscribing process. In a second example, each subscribing process may be sent a link to the data, as located in an incoming-data data record 300 of the incoming-data database 206.

Data may be present in the incoming-data database 206 that is not subscribed-to by any process, and such data may be deleted. Additionally, subscribed-to data that is no longer needed by any process may be deleted by the device hub 108 or the process(es) 110-116, as indicated by the design of the system, including factors such as how many processes had subscriptions to the data.

Figure 3B:
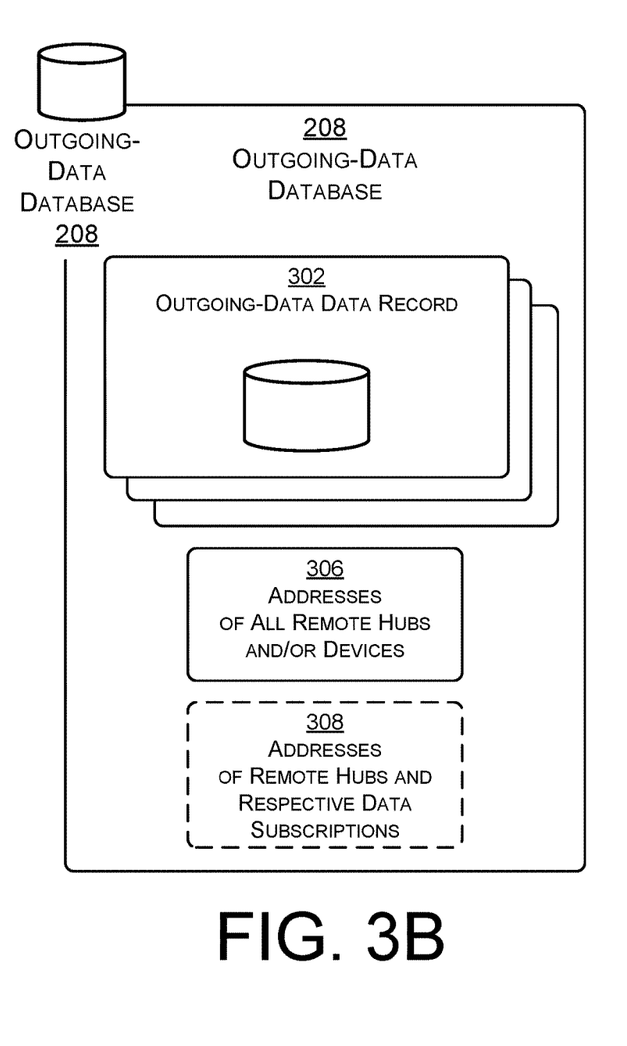

FIG. 3B shows additional detail of an example outgoing-data database 208. The outgoing-data database 208 stores data—generated by processes on the first device, which may have originated at one or more of the data-generating devices 204—in outgoing-data data records 302 until the data can and/or should be sent to other devices. The outgoing-data database 208 may also store data (e.g., in records 302) generated by process(es) of the device that is subscribed-to by other process(es) of the device.

In a first example of the outgoing data transmission, the data in the outgoing-data data records 302 is sent to all devices on a network and/or portion of the network. Addresses for the destination devices may be stored in the data structure 306. Some of the destination devices may not need the data. While this example takes up more network and/or RF bandwidth than is required, it reduces the overhead of managing subscriptions.

In a second example, the device hub 108 uses data structure 308 to obtain addresses of all hubs in the network having subscriptions to data contained in each of the records of the outgoing-data data records 302. The hub then sends appropriate data (i.e., the subscribed-to data) to appropriate (i.e., subscribing) hubs as indicated by the data structure 308. While this action takes up less network and/or RF bandwidth than was required by the first example, it increases the overhead of managing subscriptions.

Example Methods

In some examples of the techniques discusses herein, the methods of operation may be performed by one or more application specific integrated circuits (ASIC) or may be performed by a general-purpose processor utilizing software defined in computer readable media. In the examples and techniques discussed herein, the memory 202 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 4:
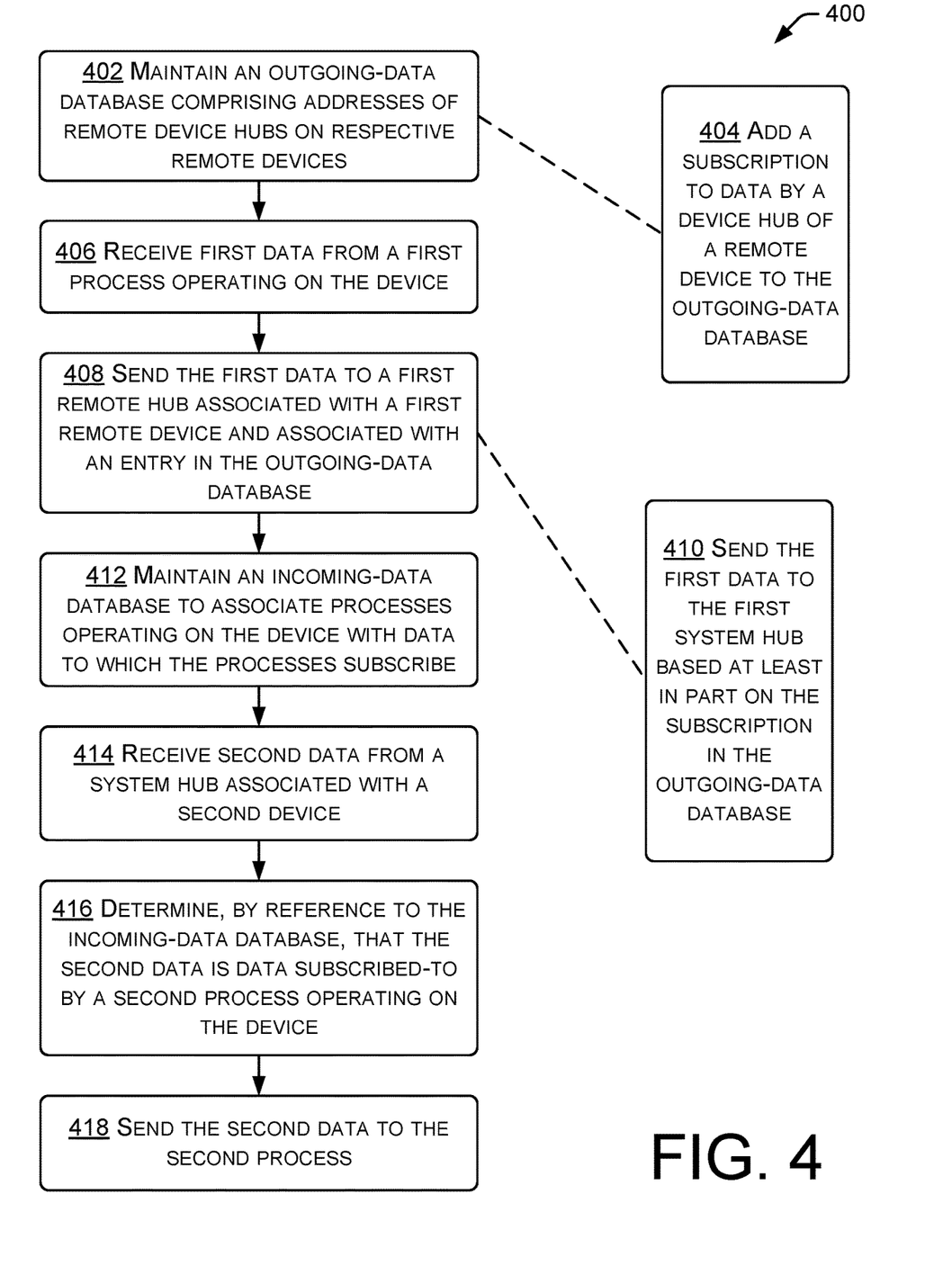
FIG. 4 is a flowchart showing example techniques by which incoming and outgoing data is efficiently received and sent by a network-connected device and by which incoming-data and outgoing data databases are maintained.

FIG. 4 shows example techniques 400 by which incoming and outgoing data is efficiently received and sent by a network-connected device and by which incoming-data and outgoing data databases are maintained on the network-connected device.

At block 402, an outgoing-data database is maintained. In the example of FIG. 3B, the outgoing-data database 208 may include data to be sent (e.g., in the form of outgoing-data data records 302). In an example, the maintained database may include addresses of the remote hubs and/or remote devices, without information on the data subscriptions of each device (e.g., data structure 306).

In the version of the techniques 400 seen at block 404, a subscription to data by a remote device hub of a remote device may be added to the outgoing-data database. In the second version, the maintained database may include addresses of the remote hubs and/or remote devices, along with information on the data subscriptions of each device (e.g., data structure 308 of FIG. 3B).

At block 406, first data from a first process operating on the device is received. In the example of FIG. 1, the process 128 may send data (e.g., data the process has generated) to the container hub 122. The container hub may send the data to the device hub 108, where it is received. Similarly, the process 110 may generate and send data directly to the device hub 108, where it is received. In the example of FIG. 3B, the data may be stored in a record 302 of the outgoing-data database 208.

At block 408, the first data is sent to a first remote device hub associated with a first remote device and associated with an entry in the outgoing-data database. In the example of FIG. 1, the data may be sent by the device hub 108 of device 102 to device 104. In the example of FIG. 3B, the data is obtained from a record 302 of the outgoing-data database 208 and is sent after reference to either of data structures 306 or 308.

In the version of the techniques 400 seen at block 410, the first data may be sent to the first remote device hub based at least in part on the subscription in the outgoing-data database. In the example of FIG. 3B, the data structure 308 includes addresses of remote device hubs (e.g., a device hub (not shown) of device 104) and a description and/or identification of the data to which each remote hub is subscribed. Accordingly, using the data structure 308 the data may be sent to a remote device hub, e.g., for relay by the device hub of the remote device to a container hub and/or process operating on the remote device.

At block 412, an incoming-data database is maintained. The incoming-data database is configured to associate processes operating on the device with data to which the processes subscribe. In the example of FIG. 1, processes 110-116 and 124-130 may have subscriptions to particular data. To assist the device hub 108 in properly forwarding the desired data to the appropriate process, the incoming-data database 206 is maintained. In an example of the maintenance, incoming data is added to incoming-data data records 300 of the database 206, and when the data is no longer needed, it is removed/deleted.

At block 414, second data is received from a second device hub associated with a second device. In the example of FIG. 3A, the data may be stored in a record of the incoming-data database 206.

At block 416, by reference to the incoming-data database, it is determined that the second data is data subscribed-to by a second process operating on the device. In the example of FIG. 3A, the device hub 108 (of FIGS. 1 and 2) may reference the data structure 304 to determine processes operating on the device and their respective subscriptions to data. The data structure would indicate that the second data was subscribed-to by the second process. Accordingly, at block 418, the second data is sent to the second process.

Figure 5:
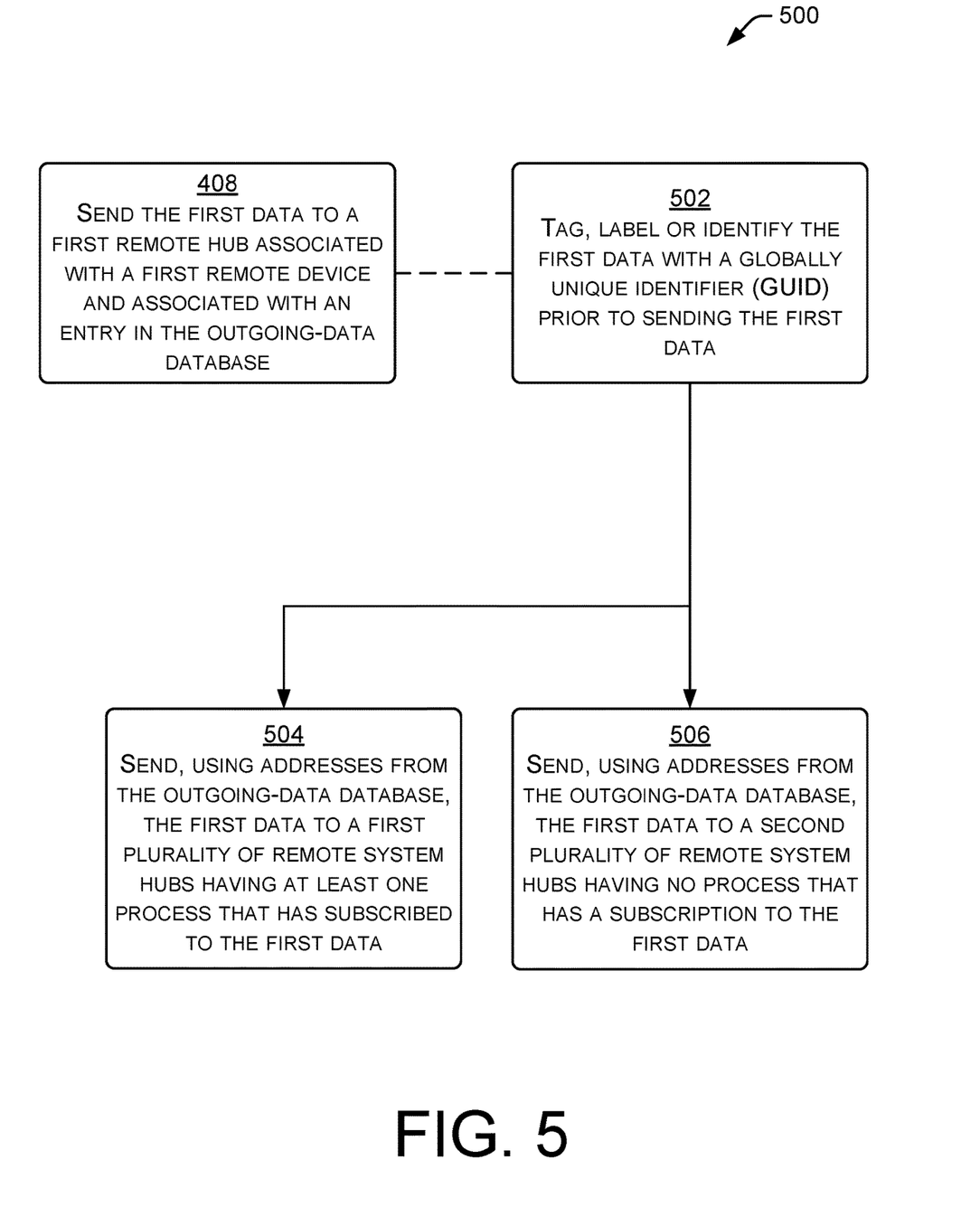
FIG. 5 is a flowchart showing example techniques by which data is generated, labeled, and sent (in some examples to remote hubs that have, and have not, subscribed to the data).

FIG. 5 shows additional example techniques 500 by which the network-connected device—aspects of whose operation was described in FIG. 4—are performed. In an example, data is generated, labeled and sent at the network-connected device. In a first example, the data is sent to remote devices that have not subscribed to the data, thereby saving the overhead of subscription management. In a second example, the data is sent only to remote devices that have subscribed to the data, thereby reducing the use of radio bandwidth. In the example of FIG. 1, data may be sent from networked-device 102 to remote device 104 because device 104 sent device 102 a subscription, to thereby reduce the use of radio spectrum. Alternatively, data may be sent even if no subscription was sent, to save the overhead of subscription management. Accordingly, the techniques 500 provide additional examples of the techniques of block 408 of FIG. 4, wherein the first data is sent to a first remote device hub associated with a first remote device and associated with an entry in the outgoing-data database.

At block 502, the first data is tagged, labeled and/or identified with a globally unique identifier (GUID) prior to sending the first data. By tagging, labeling and/or identifying data, which may be stored in the outgoing-data database 208 of FIG. 3, it is easier to send appropriate data to a remote device.

In the alternative of block 504, using addresses from the outgoing-data database, the first data is sent to a first plurality of remote hubs having at least one process that has subscribed to the first data.

In the alternative of block 506, using addresses from the outgoing-data database, the first data is sent to a second plurality of remote hubs having no process that has a subscription to the first data.

Accordingly, blocks 504 and 506 are representative of two data transmission strategies. In the strategy of block 504, data is sent by a device to devices that have subscribed to that data (e.g., using data structure 308 of FIG. 3B). In the strategy of block 506, data is sent to all networked devices, and used or discarded as appropriate (e.g., using data structure 306 of FIG. 3B).

Figure 6:
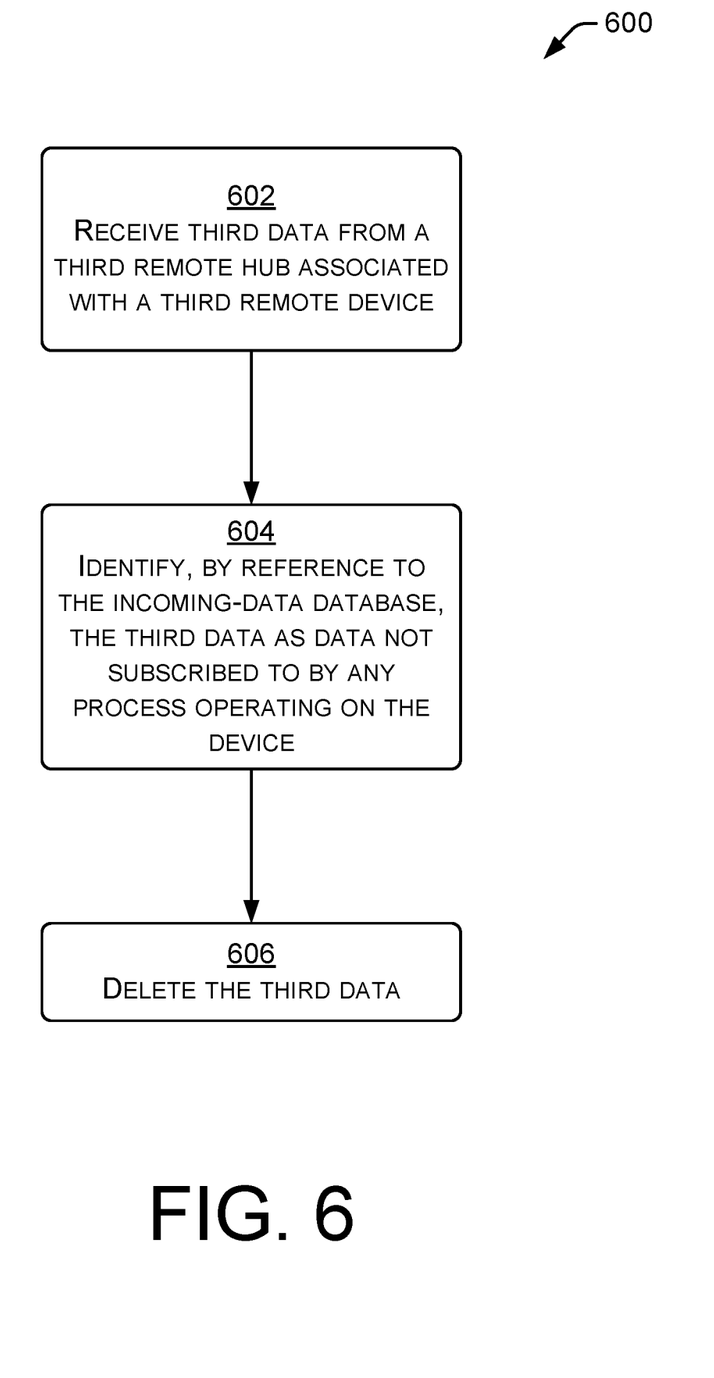
FIG. 6 is a flowchart showing example techniques by which data is received, identified as of no use by any process associated with hub(s) of a device, and is deleted.

FIG. 6 shows example techniques 600 by which data is received, identified as being of no use by any process associated with hub(s) of a device, and is deleted. Thus, the example techniques are consistent with block 506 of FIG. 5, wherein data is sent to all networked devices—including those that do not have a use for the data—and is therefore deleted.

At block 602, third data is received from a third remote hub associated with a third remote device. At block 604, by referring to the incoming-data database, the third data is identified as data not subscribed-to by any process operating on the device. At block 606, the third data is deleted.

Figure 7:
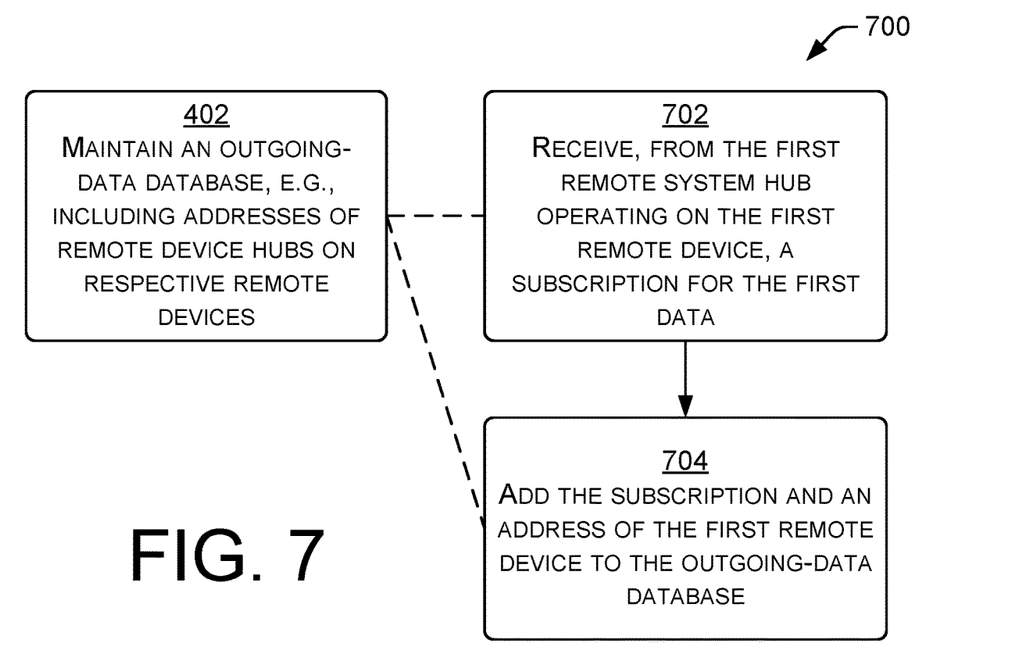
FIG. 7 is a flowchart showing example techniques by which an outgoing-data database is maintained, including receiving subscriptions and managing addresses of remote hubs that have subscribed to data, by type, identity, etc.

FIG. 7 shows example techniques 700 that assist a hub of a device to efficiently send subscribed-to data to other hubs of other devices. The techniques describe example creation and/or maintenance of an outgoing-data database (e.g., outgoing-data database 208 of FIG. 3B. The techniques describe receiving subscriptions, identification of the subscribed-to data, and managing addresses of remote networked devices that have subscribed to particular data. Accordingly, the techniques 700 show an example by which blocks 402 and/or 404 of FIG. 4 may be performed. In example use of the outgoing-data database 208, data may be sent to a remote networked device based at least in part on reference to the subscription, desired data, and recipient device address found in the outgoing-data database.

At block 702, a subscription for data is received. In the example of FIG. 1, the subscription may be received by the device hub 108 of the device 102. The subscription may be received from a device hub on a remote device (e.g., the remote device 104). The subscription may be related to a process operating on the device 104. The process may operate on device 104 in a manner similar to processes 110-116 of device 102. Alternatively, the process may be in a container of device 104 (similar to processes 124-130 of container 120 of device 102).

At block 704, the subscription and an address of the first remote device are added to the outgoing-data database, e.g., the outgoing-data database 208 of FIG. 2. The subscription may indicate the type, kind, identification number and/or alphanumeric string, etc., that identifies the subscribed-to data. In the example of FIG. 2, because the subscription and address are available in the outgoing-data database 208, the device hub 108 of the device 102 is able to send the desired data to the desired location in a mono-cast or multicast manner (i.e., without broadcasting the data).

Figure 8:
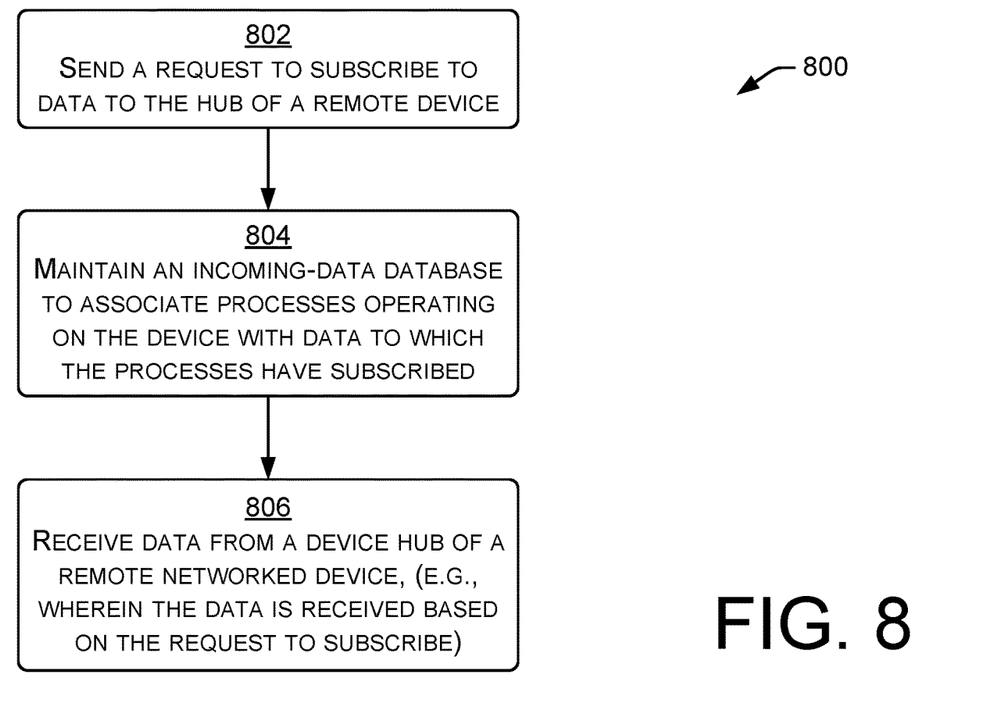
FIG. 8 is a flowchart showing example techniques by which a hub subscribes to data and maintains an incoming-data database to receive incoming data.

FIG. 8 shows example techniques 800 usable by a hub (or other structure) of a device to efficiently subscribe to data in the possession of other networked devices. The techniques describe example creation and/or maintenance of an incoming-data database to receive incoming—e.g., subscribed-to—data. Information from the incoming-data database (e.g., incoming-data database 206 of FIGS. 2 and 3) may also be used to relay incoming data to appropriate processes operating on the device.

At block 802, a request to subscribe to data is sent to a device hub of a remote networked device. In the example of FIG. 1, a networked device (e.g., device 102) may send a request to subscribe to data to a hub of the networked device 104.

At block 804, an incoming-data database is maintained in a manner that associates processes operating on the device (and in examples, their addresses) with data to which the processes have subscribed. In the example of FIG. 3A, each incoming-data data record 300 of the incoming-data database 206 associates a process of the device 102 with data to which it has subscribed. Accordingly, when the data arrives at the device hub 108, that hub will know (by referencing the database) to which process(es) to send each item of the data.

At block 806, data is received from the device hub associated with the remote networked device. In an example, the data is received based at least in part on the request to subscribe and/or the subscription.

Figure 9:
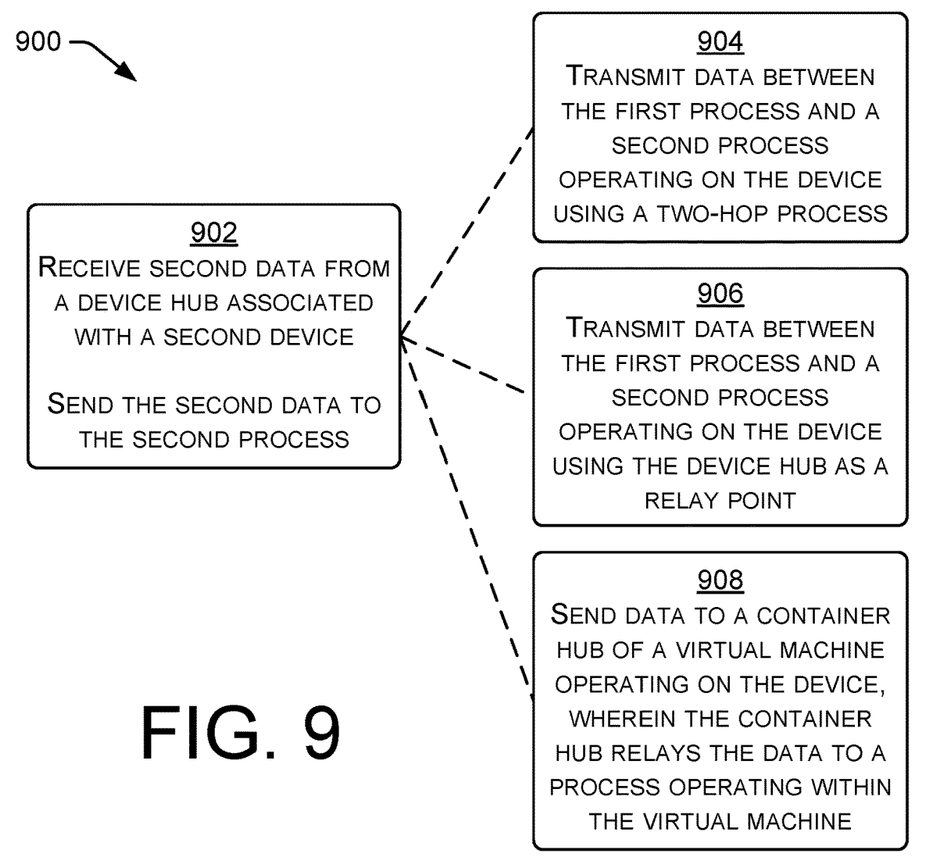
FIG. 9 is a flowchart showing example techniques by which data is transmitted inter-device and intra-device, such as by using a two-hop technique, a relay technique involving a hub as a relay point, and techniques for moving data intra-device to and/or from virtual machines.

FIG. 9 shows example techniques 900 by which data is transmitted inter-device and intra-device, such as by using a two-hop technique, a relay technique involving a hub as a relay point, and techniques for moving data intra-device to virtual machines. Accordingly, the techniques 900 are an example method to perform blocks 414 and 418 of FIG. 4. In the example of FIG. 1, the device hub 108 sends data to, and receives data from, each process 110-116. Additionally, the device hub 108 sends data to, and receives data from, container hub 122. Similarly, container hub 122 sends data to, and receives data from, each process 124-130. Accordingly, data moving from process 124 to process 110 passes through container hub 122 and device hub 108 using an intra-device and/or two-hop technique.

At block 902, actions seen in blocks 414 and 418 of FIG. 4 are revisited. In a first action, second data is received from a device hub associated with a second device. In FIG. 4, the "first data" was outgoing data sent from the networked device to a remote networked device (e.g., in the example of FIG. 1, from device 102 to device 104). In FIG. 4, the "second data" was incoming data sent from a remote networked device to the networked device. In a second action, the second data is sent to the second process. Accordingly, the data discussed in FIG. 9 is incoming data from a remote networked device (e.g., device 104 of FIG. 1) that must be relayed to an appropriate process on the receiving device (e.g., device 102 of FIG. 1). Blocks 904-908 describe three example techniques by which data may be relayed.

At block 904, data is transmitted between the first process and a second process operating on the device using a two-hop process. Referring to FIG. 1, the relay location may the device hub 108, or the container hub 122. In a three-hop data transmission, both the device hub 108 and the container hub 122 could relay the data from a process in communication with the device hub to the container hub, which could relay the data to a process in the container.

At block 906, data may be transmitted between the first process and a second process operating on the device using the hub as a relay point. In an example, a first process may control operation of a radio, and would receive the incoming data. In a two-hop process, the data moves from the first process to a device hub, and is then transferred to the second process.

At block 908, data is sent to a container hub of a virtual machine operating on the device, wherein the container hub relays the data to a process operating within the virtual machine. In a further example, the data sent to the container hub could have been sent by a process operating within the container and/or virtual machine.

Figure 10:
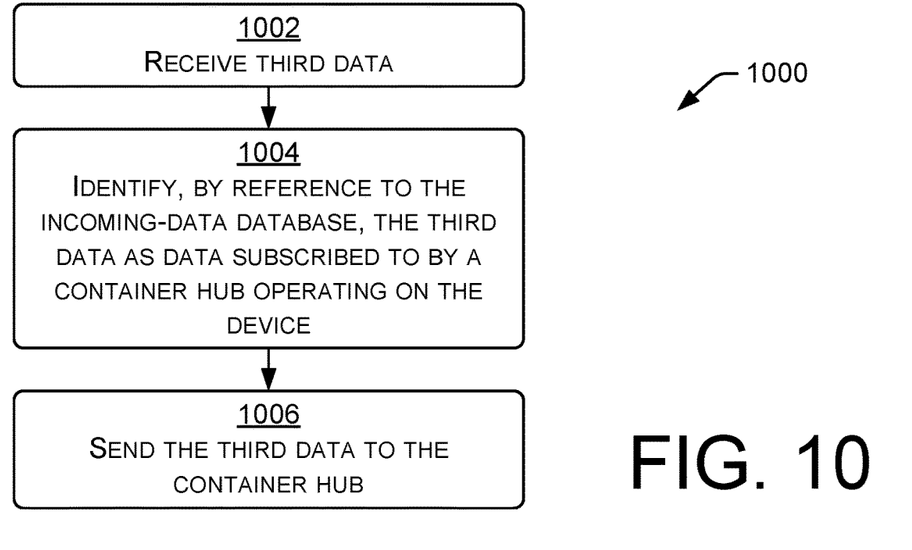
FIG. 10 is a flowchart showing example techniques by which data is received at a hub, identified as subscribed-to by a container and/or virtual machine operating on a device of the hub, and is then sent to a hub of the container.

FIG. 10 shows example techniques 1000 by which data is received at a device hub of a device. The device hub identifies the data as subscribed-to by a process operating within a container and/or virtual machine operating on the device. The data is then sent to the container hub within the container.

At block 1002, third data is received. At block 1004, by referring to the incoming-data database, the third data is identified as data subscribed to by a container hub operating on the device. At block 1006, the third data is sent to the container hub.

Figure 11:
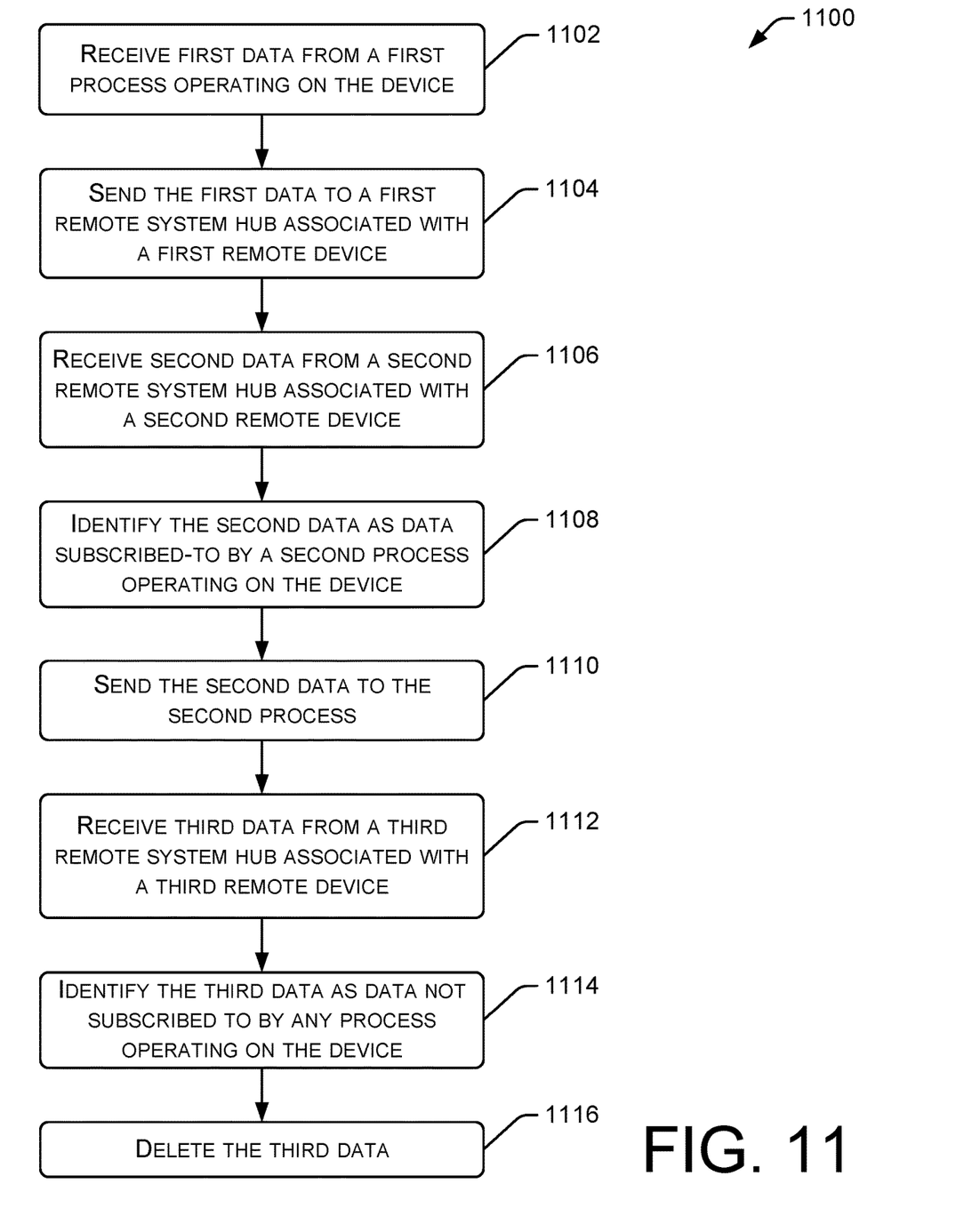

FIG. 11 shows example techniques 1100 by which incoming and outgoing data is efficiently received and sent by a network-connected device, and showing example techniques for managing subscribed-to data and data that was not subscribed-to.

At block 1102, first data is received from a first process operating on the device. In the example of FIG. 2, a process (e.g., one of processes 110-116) is operating on the device 102. The process may be gathering data from a data-generating device 204. The process sends the data to the device hub 108 where it is received. The hub device 108 may store the data in the outgoing-data database 208.

At block 1104, the first data is sent to a first remote device hub associated with a first remote device. In the example of FIG. 2, the first data is obtained (e.g., from the outgoing-data database 208 and is sent to a device hub of a remote device (e.g., device 104).

At block 1106, second data is received from a second remote device hub associated with a second remote device. In the example of FIG. 2, incoming data may be saved in the incoming-data database 206.

At block 1108, the second data is identified as data subscribed-to by a second process operating on the device. In the example of FIG. 2, the device hub 108 may periodically or continuously check the incoming-data database 206 to identify data that may be needed, or subscribed-to, by a process operating on the device.

At block 1110, the second data is sent to the second process. In the example of FIG. 2, the device hub 108, having identified data as subscribed-to by a process (operating on device 102), sends the data to the process. After confirmation of receipt, the data may be deleted from the incoming-data database 206.

At block 1112, third data is received from a third remote device hub associated with a third remote device. In the example of FIG. 2, incoming data may be saved in the incoming-data database 206.

At block 1114, the third data is identified as data not subscribed to by any process operating on the device. In the example of FIG. 2, the device hub 108 checks the incoming-data database 206 but fails to identify data that may be needed, or subscribed-to, by any process operating on the device.

Accordingly, at block 1116, the third data is deleted.

Figure 12:
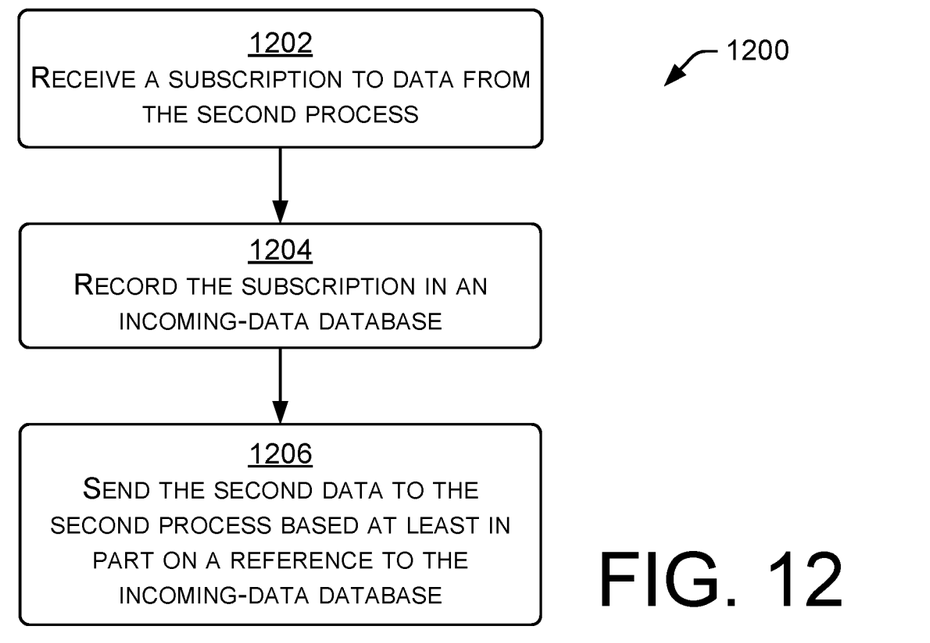
FIG. 12 is a flowchart showing example techniques by which data transmission is based at least in part on reference to database(s) that may be maintained by hubs.

FIG. 12 shows example techniques 1200 by which data transmission is based at least in part on reference to database(s) that may be maintained by hubs.

At block 1202, a subscription to data is received from a second process. In the example of FIG. 2, a process (e.g., process 110) subscribes to data by sending a subscription to the device hub 108 on the device 102.

At block 1204, the subscription is recorded in an incoming-data database. In the example of FIG. 2, the subscription may be added to data structure 304 of the incoming-data database 206. That is, the data to which process 110 has subscribed may be coming from a different device (e.g., device 104).

At block 1206, the second data is sent to the second process based at least in part on a reference to the incoming-data database. In the example of FIG. 2, the device hub 108 consults the incoming-data database 206 and recognizes that the second data was subscribed to by the second process. The recognition may be based on a data identification number, a type of data, or another factor.

Figure 13:
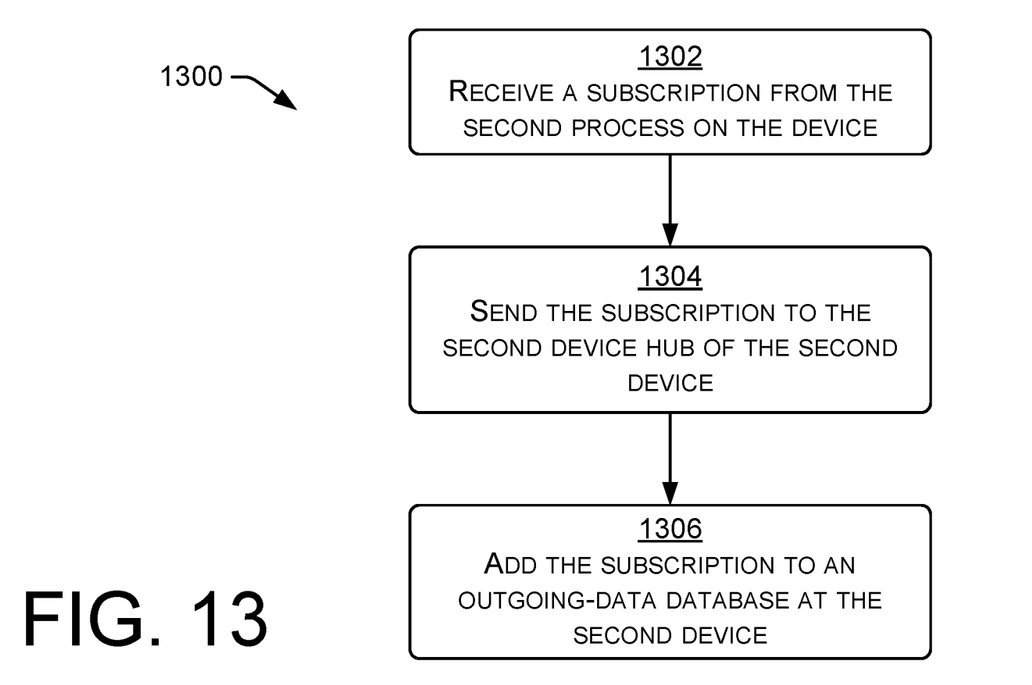
FIG. 13 is a flowchart showing example techniques by which data subscriptions are managed.

FIG. 13 shows example techniques 1300 by which data subscriptions are managed. In an example, a process sends a subscription request to its device hub. If the process is within a container, the container hub relays the subscription request to the device hub. In anticipation of incoming data resulting from the subscription, the device hub saves the subscription request in the incoming-data database. The device hub then sends the subscription request to a remote device. At the remote device, the device hub puts the subscription request in the outgoing-data database of the remote device. Accordingly, the data needed by the process and the address of the device of the process are available to the device hub of the remote device, which will result in data transmissions to the process.

At block 1302, a subscription is received from the second process. In the example of FIG. 1, the device hub 108 may receive a subscription (i.e., a subscription request) from a process (e.g., process 124 or 110). Referring to FIG. 1, the device hub 108 may store the subscription in the incoming-data database 206, so that when the data arrives the hub may identify the data as subscribed-to, and by which process.

At block 1304, the subscription is sent to a device hub of a remote device. In the example of FIG. 2, the subscription may be sent to a hub of the remote device 104.

At block 1306, the subscription (or data related to, or obtained from, the subscription) is added to an outgoing-data database at the second device. In the example of FIG. 2, the structure of device 104 may be similar to the structure of device 102. Accordingly, the device hub of device 104 may store the subscription (or data related to, or obtained from, the subscription) in the outgoing-data database of that device.

Example Systems and Devices

The following examples of hub and spoke publish-subscribe are expressed as number clauses. While the examples illustrate a number of possible configurations and techniques, they are not meant to be an exhaustive listing of the systems, methods, and/or techniques described herein.

1. A method of operating a device on a network, comprising: maintaining an outgoing-data database comprising addresses of remote device hubs on respective remote devices; receiving first data from a first process operating on the device; sending the first data to a first remote hub associated with a first remote device and associated with an entry in the outgoing-data database; maintaining an incoming-data database to associate processes operating on the device with data to which the processes subscribe; receiving second data from a second device hub associated with a second device; determining, by reference to the incoming-data database, that the second data is data subscribed-to by a second process operating on the device; and sending the second data to the second process.

2. The method of clause 1, additionally comprising: sending, using addresses from the outgoing-data database, the first data to a first plurality of remote device hubs having at least one process that has subscribed to the first data; and sending, using addresses from the outgoing-data database, the first data to a second plurality of remote device hubs having no process that has a subscription to the first data.

3. The method of clause 1, additionally comprising: receiving third data from a third remote device hub associated with a third remote device; identifying, by reference to the incoming-data database, the third data as data not subscribed to by any process operating on the device; and deleting the third data.

4. The method of clause 1, wherein maintaining an outgoing-data database comprises: adding a subscription to data by a device hub of a remote device to the outgoing-data database.

5. The method of clause 1, wherein: maintaining the outgoing-data database comprises: receiving, from the first remote device hub operating on the first remote device, a subscription for the first data; and adding the subscription and an address of the first remote device to the outgoing-data database; and sending the first data to the first remote device hub is based at least in part on the subscription in the outgoing-data database.

6. The method of clause 1, additionally comprising: sending a request to subscribe to the second device hub, wherein the second data is received based on the request to subscribe.

7. The method of clause 1, additionally comprising: transmitting data between the first process and a second process operating on the device, wherein transmitting the data is a two-hop transmission in which a device hub of the device relays data transmitted between the first process and the second process.

8. The method of clause 1, additionally comprising: receiving third data; identifying, by reference to the incoming-data database, the third data as data subscribed to by a container hub operating on the device; and sending the third data to the container hub.

9. The method of clause 1, additionally comprising: tagging the first data with a globally unique identifier (GUID) upon generation of the data by the first process or prior to sending the first data.

10. The method of clause 1, wherein the method is performed by a device hub operating on the device, and wherein the method additionally comprises: sending data to a container hub of a virtual machine operating on the device, wherein the container hub relays the data to a process operating within the virtual machine.

11. A device, comprising: a processor; memory, connected to the processor; an outgoing-data database, defined in the memory, comprising: data obtained from local processes to be sent to remote device hubs of respective remote devices; and addresses of the remote device hubs of the remote devices; an incoming-data database, defined in the memory, comprising: data received from at least one of the remote device hubs; local subscriptions for data; and addresses of local processes; and a device hub, configured to maintain the outgoing-data database and the incoming-data database.

12. The device as recited in clause 11, additionally comprising instructions stored in the memory, that when executed by the processor, cause the device to perform actions comprising: sending, using addresses from the outgoing-data database, first data to a first plurality of remote device hubs having at least one process that has locally subscribed to the first data; and sending, using addresses from the outgoing-data database, the first data to a second plurality of remote device hubs having no process that has subscribed to the first data.

13. The device as recited in clause 11, additionally comprising instructions stored in the memory, that when executed by the processor, cause the device to perform actions comprising: receiving data from a remote device hub associated with a remote device; identifying, by reference to the incoming-data database, the data as data not subscribed to by any process operating on the device; and deleting the data.

14. The device as recited in clause 11, wherein the outgoing-data database additionally comprises: a subscription to data by a remote device hub of a remote device.

15. The device as recited in clause 11, additionally comprising instructions stored in the memory, that when executed by the processor, cause the device to perform actions comprising: receiving, from a first remote device hub operating on a first remote device, a subscription for first data; and adding the subscription to the outgoing-data database.

16. The device as recited in clause 11, additionally comprising instructions stored in the memory, that when executed by the processor, cause the device to perform actions comprising: receiving first data from a first process operating on the device; sending the first data to a first remote device hub associated with a first remote device and associated with an entry in the outgoing-data database; receiving second data from a second device hub associated with a second device; determining, by reference to the incoming-data database, that the second data is data subscribed-to by a second process operating on the device; and sending the second data to the second process.

17. The device as recited in clause 11, additionally comprising instructions stored in the memory, that when executed by the processor, cause the device to perform actions comprising: receiving first data; identifying, by reference to the incoming-data database, the first data as data subscribed to by a container hub operating on the device; and sending the first data to the container hub.

18. A method of managing data handling on a device on a network, comprising: receiving first data from a first process operating on the device; sending the first data to a first remote device hub associated with a first remote device; receiving second data from a second device hub associated with a second device; identifying the second data as data subscribed-to by a second process operating on the device; sending the second data to the second process; receiving third data from a third remote device hub associated with a third remote device; identifying the third data as data not subscribed to by any process operating on the device; and deleting the third data.

19. The method of clause 18, additionally comprising: receiving a subscription from the second process; recording the subscription in an incoming-data database; and sending the second data to the second process based at least in part on a reference to the incoming-data database.

20. The method of clause 18, additionally comprising: receiving a subscription from the second process; and sending the subscription to the second device hub.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of operating a device on a network, comprising:
   maintaining an outgoing-data database comprising addresses of remote device hubs on respective remote devices;
   receiving, at a container hub operating within a container defined on the device, first data from a first process operating in the container on the device;
   relaying the first data from the container hub to a device hub of the device;
   maintaining:
      a first data structure comprising addresses of the remote device hubs of the respective remote devices, wherein some but not all of the remote device hubs have subscriptions to data from the outgoing-data database; and
      a second data structure comprising addresses of remote device hubs of respective remote devices having subscriptions to data from the outgoing-data database;
      wherein use of the first data structure to send data from the outgoing-data database results in less overhead in managing subscriptions than use of the second data structure; and
      wherein use of the second data structure to send data from the outgoing-data database consumes less network bandwidth than use of the first data structure; and
   sending the first data from the device hub to a second device hub associated with a second device, wherein the sending comprises sending to an address obtained from either of the first data structure or the second data structure.

2. The method of claim 1, additionally comprising:
   sending, using addresses from the outgoing-data database, the first data to a first plurality of remote device hubs having at least one process that has subscribed to the first data; and
   sending, using addresses from the outgoing-data database, the first data to a sending, using addresses from the outgoing-data database, the first data to a second plurality of remote device hubs having no process that has a subscription to the first data.

3. The method of claim 1, additionally comprising:
   receiving third data from a third device hub associated with a third remote device;
   identifying, by reference to an incoming-data database, the third data as data not subscribed to by any process operating on the device; and
   deleting the third data.

4. The method of claim 1, wherein maintaining the outgoing-data database comprises:
   adding a subscription to data by a device hub of a remote device to the outgoing-data database.

5. The method of claim 1, wherein:
maintaining the outgoing-data database comprises:
  receiving, from the second device hub operating on the second device, a subscription for the first data; and
  adding the subscription and an address of the second device to the outgoing-data database; and
sending the first data to the second device hub is based at least in part on the subscription in the outgoing-data database.

6. The method of claim 1, additionally comprising:
sending a request to subscribe to the second device hub, wherein second data is received based on the request to subscribe.

7. The method of claim 1, additionally comprising:
transmitting data between the first process and a second process operating on the device,
wherein transmitting the data is a two-hop transmission in which the device hub of the device relays data transmitted between the first process and the second process.

8. The method of claim 1, additionally comprising:
receiving third data;
identifying, by reference to an incoming-data database, the third data as data subscribed to by the container hub operating on the device; and
sending the third data to the container hub.

9. The method of claim 1, additionally comprising:
tagging the first data with a globally unique identifier (GUID) upon generation of the data by the first process or prior to sending the first data.

10. The method of claim 1, wherein the method is performed by a device hub operating on the device, and wherein the method additionally comprises:
sending data to a container hub of a virtual machine operating on the device,
wherein the container hub of the virtual machine relays the data to a process operating within the virtual machine.

11. A device, comprising:
a processor;
memory, connected to the processor;
an outgoing-data database, defined in the memory and accessible by the processor, comprising:
  data obtained from local processes to be sent to remote device hubs of respective remote devices;
  a first data structure comprising addresses of the remote device hubs of the respective remote devices, wherein some but not all of the remote device hubs have subscriptions to data from the outgoing-data database; and
  a second data structure comprising addresses of remote device hubs of respective remote devices having subscriptions to data from the outgoing-data database;
  wherein use of the first data structure to send data from the outgoing-data database results in less overhead in managing subscriptions than use of the second data structure; and
  wherein use of the second data structure to send data from the outgoing-data database consumes less network bandwidth than use of the first data structure; and
an incoming-data database, defined in the memory, comprising:
  data received from at least one of the remote device hubs;
  local subscriptions for data; and
  addresses of local processes;
a device hub, configured to maintain the outgoing-data database and the incoming-data database; and
a container hub, in communication with the device hub, wherein messages are configured to be transferred between the device hub and the container hub based at least in part on the outgoing-data database and the incoming-data database.

12. The device as recited in claim 11, additionally comprising instructions stored in the memory, that when executed by the processor, cause the device to perform actions comprising:
sending, using addresses from the outgoing-data database, first data to a first plurality of remote device hubs having at least one process that has locally subscribed to the first data; and
sending, using addresses from the outgoing-data database, the first data to a second plurality of remote device hubs having no process that has subscribed to the first data.

13. The device as recited in claim 11, additionally comprising instructions stored in the memory, that when executed by the processor, cause the device to perform actions comprising:
receiving data from a remote device hub from among the remote device hubs;
identifying, by reference to the incoming-data database, the data as data not subscribed to by any process operating on the device; and
deleting the data.

14. The device as recited in claim 11, wherein the outgoing-data database additionally comprises:
a subscription to data by a remote device hub from among the remote device hubs.

15. The device as recited in claim 11, additionally comprising instructions stored in the memory, that when executed by the processor, cause the device to perform actions comprising:
receiving, from a first remote device hub operating on a first remote device, a subscription for first data; and
adding the subscription to the outgoing-data database.

16. The device as recited in claim 11, additionally comprising instructions stored in the memory, that when executed by the processor, cause the device to perform actions comprising:
receiving first data from a first process operating on the device;
sending the first data to a first remote device hub associated with a first remote device and associated with an entry in the outgoing-data database;
receiving second data from a second device hub associated with a second device;
determining, by reference to the incoming-data database, that the second data is data subscribed-to by a second process operating on the device; and
sending the second data to the second process.

17. The device as recited in claim 11, additionally comprising instructions stored in the memory, that when executed by the processor, cause the device to perform actions comprising:
receiving first data;
identifying, by reference to the incoming-data database, the first data as data subscribed to by the container hub operating on the device; and
sending the first data to the container hub.

18. A method of managing data handling on a device on a network, comprising:

maintaining an outgoing-data database comprising addresses of remote device hubs on respective remote devices;

receiving, at a container hub operating within a container defined on the device, first data from a first process operating in the container on the device;

relaying the first data from the container hub to a device hub of the device;

maintaining:

a first data structure comprising addresses of the remote device hubs of the respective remote devices, wherein some but not all of the remote device hubs have subscriptions to data from the outgoing-data database; and a second data structure comprising addresses of remote device hubs of respective remote devices having subscriptions to data from the outgoing-data database;

wherein use of the first data structure to send data from the outgoing-data database results in less overhead in managing subscriptions than use of the second data structure; and wherein use of the second data structure to send data from the outgoing-data database consumes less network bandwidth than use of the first data structure; and sending the first data from the device hub to a first remote device hub associated with a first remote device, wherein the sending comprises sending to an address obtained from either of the first data structure or the second data structure;

receiving, at the device hub, second data from a second device hub associated with a second device;

identifying the second data as data subscribed-to by a second process operating on the device;

relaying the second data from the device hub to the container hub of the device;

sending the second data from the container hub to the second process;

receiving third data from a third remote device hub associated with a third remote device;

device;

identifying the third data as data not subscribed to by any process operating on the device; and deleting the third data.

19. The method of claim 18, additionally comprising:

receiving a subscription from the second process;

recording the subscription in an incoming-data database; and sending the second data to the second process based at least in part on a reference to the incoming-data database.

20. The method of claim 18, additionally comprising:

receiving a subscription from the second process; and sending the subscription to the second device hub.

* * * * *

UNITED STATES PATENT AND TRADEMARK OFFICE
CERTIFICATE OF CORRECTION

| | | |
|---|---|---|
| PATENT NO. | : 11,805,188 B2 | Page 1 of 1 |
| APPLICATION NO. | : 17/378526 | |
| DATED | : October 31, 2023 | |
| INVENTOR(S) | : Bernard M. Woodland et al. | |

It is certified that error appears in the above-identified patent and that said Letters Patent is hereby corrected as shown below:

On the Title Page

Column 1, item (72), Please add "Matthew Rockey, Fishers, IN (US)" to the list of inventors.

Signed and Sealed this
Nineteenth Day of November, 2024

Katherine Kelly Vidal
*Director of the United States Patent and Trademark Office*